United States Patent
Kalbacher et al.

(10) Patent No.: US 9,618,283 B2
(45) Date of Patent: Apr. 11, 2017

(54) HEAT EXCHANGER HOUSING CONNECTION

(71) Applicants: Modine Manufacturing Company, Racine, WI (US); Mann+Hummel GmbH, Ludwigsburg (DE)

(72) Inventors: Klaus Kalbacher, Rangendingen (DE); Rebecca Frey, Esslingen (DE); Gerrit-Tobias Speidel, Ludwigsburg (DE); Alexander Korn, Güglingen (DE); Heinz Bühl, Erlenbach (DE); Karl-Ernst Hummel, Bietigheim-Bissingen (DE); Ulrich Dehnen, Kornwestheim (DE)

(73) Assignees: MODINE MANUFACTURING COMPANY, Racine, WI (US); MANN+HUMMEL GMBH, Ludwigsburg (DE)

( * ) Notice: Subject to any disclaimer, the term of this patent is extended or adjusted under 35 U.S.C. 154(b) by 71 days.

(21) Appl. No.: 14/243,031

(22) Filed: Apr. 2, 2014

(65) Prior Publication Data

US 2014/0300105 A1    Oct. 9, 2014

(30) Foreign Application Priority Data

Apr. 4, 2013 (DE) .................. 10 2013 005 806

(51) Int. Cl.
*F28D 7/10* (2006.01)
*F28F 9/02* (2006.01)
(Continued)

(52) U.S. Cl.
CPC .......... *F28F 9/0248* (2013.01); *F16L 21/035* (2013.01); *F16L 39/00* (2013.01);
(Continued)

(58) Field of Classification Search
CPC ...... F28F 9/02; F28F 9/00; F28F 9/001; F28F 9/002; F28F 9/005; F28F 9/007;
(Continued)

(56) References Cited

U.S. PATENT DOCUMENTS 3,263,747 A * 8/1966 Gordon McKay ....... F28F 9/06
165/175
5,477,919 A 12/1995 Karube
(Continued)

FOREIGN PATENT DOCUMENTS

| DE | 102006005106 A1 | 8/2007 |
| DE | 102009039569 A1 | 3/2011 |
| FR | WO 2012059152 A1 * | 5/2012 ............ F28F 9/0253 |

OTHER PUBLICATIONS

U.S. Appl. No. 14/243,038 Office Action from the US Patent and Trademark Office dated Jan. 14, 2016 (16 pages).
(Continued)

*Primary Examiner* — Frantz Jules
*Assistant Examiner* — Steve Tanenbaum
(74) *Attorney, Agent, or Firm* — Michael Best & Friedrich LLP

(57) ABSTRACT

A stub connection for a heat exchanger that is arranged in a housing. The stub connection includes a first part which is fastened to the heat exchanger and a second part which has a stub shank extending through an opening in the housing and is seated in a hole of the first part. The stub connection also includes at least two seals. The first seal is an annular seal, which is seated in a groove of the stub shank and the second seal is a gasket, which is arranged between the opening, the stub shank, and the first part. The first seal is seated in the hole and seals between the stub shank and the first part.

20 Claims, 4 Drawing Sheets

(51) Int. Cl.
*F28D 7/00* (2006.01)
*F16L 21/035* (2006.01)
*F28F 9/04* (2006.01)
*F16L 39/00* (2006.01)
*F16L 41/08* (2006.01)
*F28D 9/00* (2006.01)

(52) U.S. Cl.
CPC .......... *F16L 41/086* (2013.01); *F28D 9/0043* (2013.01); *F28F 9/0253* (2013.01); *F28F 9/04* (2013.01); *F28F 2280/06* (2013.01)

(58) Field of Classification Search
CPC .. F28F 9/0075; F28F 2225/02; F28F 2280/06; F28F 2275/14; F28F 9/0246; F28F 9/0248; F28F 9/0251; F28F 9/0253; F28F 9/0256; F28F 9/04; F28F 9/26; F28F 21/067; F28F 2275/00; F28F 9/12; F28F 9/14; F01P 11/10; F24F 13/20; F24F 2013/202; F28D 9/0031; F28D 9/0043; F28D 9/0056; F28D 2021/0082; F16L 39/00; F16L 41/086; F16L 21/035; F16L 9/04; B23P 15/26
USPC .......................................... 165/162, 157–160
See application file for complete search history.

(56) References Cited

U.S. PATENT DOCUMENTS

| | | | |
|---|---|---|---|
| 6,908,117 B1* | 6/2005 | Pickett, Jr. ............ | F16L 41/086 285/137.11 |
| 2005/0023827 A1* | 2/2005 | Walterscheid ..... | B60H 1/00571 285/124.2 |
| 2005/0156388 A1 | 7/2005 | Takano | |
| 2006/0278377 A1* | 12/2006 | Martins ............... | F02B 29/0412 165/140 |
| 2008/0264621 A1* | 10/2008 | Yoshino ................. | B23P 15/26 165/178 |
| 2009/0014153 A1 | 1/2009 | Pimentel et al. | |
| 2011/0162826 A1* | 7/2011 | Garret .................. | F28F 9/0219 165/157 |
| 2012/0210955 A1* | 8/2012 | Keerl .................. | F02B 29/0462 123/41.56 |

OTHER PUBLICATIONS

Office Action from the US Patent and Trademark Office for U.S. Appl. No. 14/243,038 dated Sep. 8, 2016 (16 pages).

* cited by examiner

HEAT EXCHANGER HOUSING CONNECTION

CROSS-REFERENCE TO RELATED APPLICATIONS

This application claims priority from German Patent Application No. 10 2013 005 806.6, filed Apr. 4, 2013, which is incorporated by reference herein.

BACKGROUND

The invention relates to a stub connection for a heat exchanger which is arranged in a housing and includes a first part which is fastened to the heat exchanger and another part, having a stub shank extends through an opening in the housing and is arranged in a hole of the first part, and which has at least two seals, the first seal being an annular seal which is seated in a groove of the stub shank. The invention also relates to a heat exchanger arrangement.

DE 10 2009 039 569 A1 has disclosed a gas cooler for an internal combustion engine a stub connection. The part is soldered to a header box of the gas cooler, the gas cooler is pushed into the housing and the other part of the stub connection is screwed, through an opening in the housing, in a hole of the first part and is fastened. The groove has the first seal is situated at the uppermost end of the stub shank.

This known stub connection is advantageous because fixing of the heat exchanger in the housing is also achieved by means of the connection between the two parts of the stub connection.

The design of the sealing means is disadvantageous, however, because the second seal comes into contact on its inner side with the one heat-exchanging medium and on its outer side with the other heat-exchanging medium, as a result of which the sealing action decreases rapidly. Furthermore, a bypass, even if it is small, is produced on the gas side between the housing and the heat exchanger as a result of the screw connection of the two parts, which is disadvantageous.

SUMMARY

The object of the invention a stub connection for a heat exchanger which is arranged in a housing having the features which were specified at the outset, in such a way that the sealing action is improved.

It is provided according to one aspect of the invention that the second seal is a gasket which seals between the opening, the stub shank, and the first part, and that the first seal is seated in the hole and seals between the stub shank and the first part. The second seal is arranged above the first seal.

Because the gasket also seals toward the first part, the seals are situated in each case only in contact with one heat-exchanging medium, for which reason their efficiency is improved, also viewed over a relatively long time period. The positioning of the groove having the first seal in the lower region of the stub shank, by way of which said stub shank is seated in the hole of the first part, also contributes to the improved action.

The annular seal is preferably an O-ring seal, that is to say with an approximately round cross section. The gasket which is also of annular configuration preferably has an approximately L-shaped cross section. One limb of the L seals toward the stub shank. The distal end of the same limb seals toward the first part. The other limb seals toward the opening and/or to the outside. Here, the distal end of the other limb can abut a border of the opening.

The gasket can also have, for example, a C-shaped or U-shaped cross section; the open cross-sectional side of the gasket should point toward the opening and the closed side should lie on the stub shank.

A collar on the stub shank rests on the border and at the same time limits the insertion depth of the other part in the one part of the stub connection, as a result of which the clamping forces of the gasket also cannot rise beyond an impermissible level.

The features and their effects also result from the following description of exemplary embodiments.

DETAILED DESCRIPTION

The housing 1 can be, for example, the intake manifold 1 of an internal combustion engine, through which compressed charge air flows, in order to be cooled in the heat exchanger 2, before it is fed to an internal combustion engine (not shown). For this purpose, the charge air LL (i.e., a second heat-exchanging medium) has to be able to flow into the intake manifold 1 and, after flowing through the heat exchanger 2, also has to be able to flow out again, which can likewise not be seen, however, from the outline illustrations.

There can of course also be a different gas which is to be cooled and also a different heat exchanger which is arranged in a different housing 1.

Figure 1:
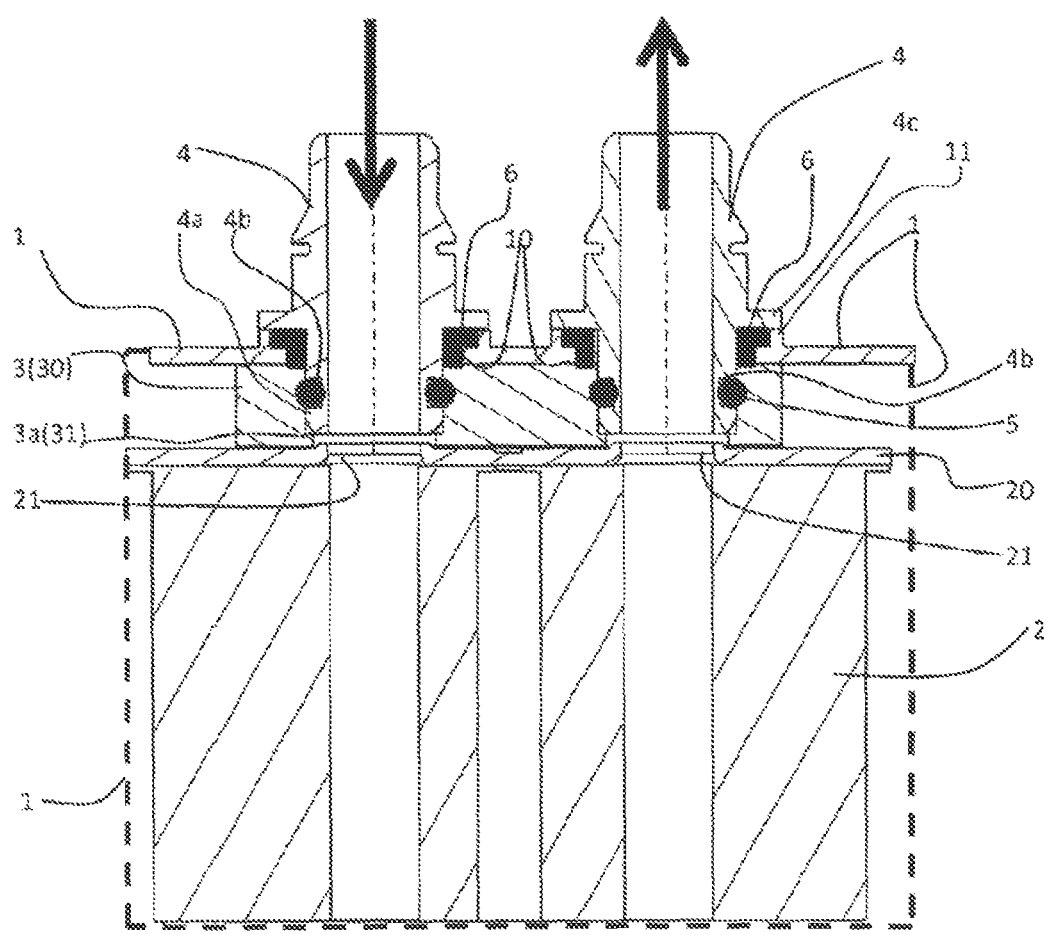
FIG. 1 shows, merely in outline, a section through the stub connection and the heat exchanger in the housing in a first exemplary embodiment.
Figure 2:
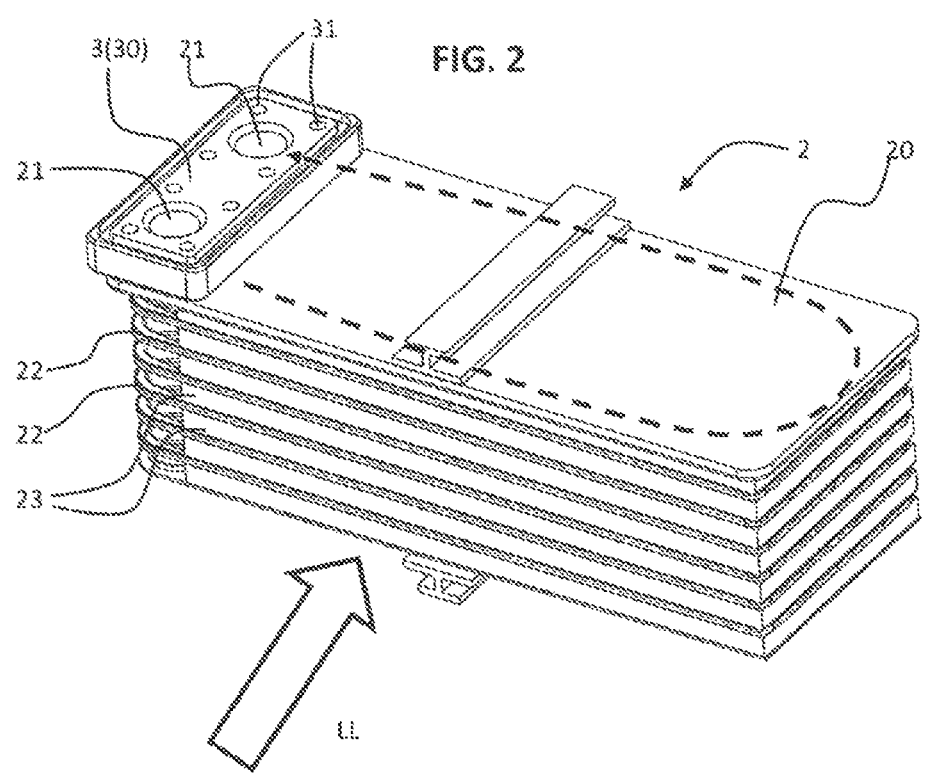
FIG. 2 shows a heat exchanger.

The heat exchanger 2 of the exemplary embodiments, which are shown in FIGS. 1 and 2, has a stack including plate pairs 22 and corrugated fins 23 which are arranged between them, through which the abovementioned charge air LL has to flow. A cover plate 20 is situated on the stack. A liquid, which flows through a stub connection and through the plate pairs 22, serves as coolant (i.e., a first heat-exchanging medium), as illustrated in FIG. 2.

In the exemplary embodiments the intake manifold 1 is made from plastic. The stub 4 with its stub shank 4a, is also a plastic part.

In contrast, the one part 3 of the stub connection is a connection block 30 which is made from metal, and is connected in a sealing and fixed manner on the cover plate 20 of the stack, is preferably soldered to it.

The intake manifold 1 has two openings 10. The stub connection which will be described in greater detail in the following text is situated in each opening 10.

Since the connection block 30, has been equipped with two through openings 31 or with two holes 3a and the connection block 30 represents the abovementioned one part 3 of the stub connection, the one part 3 can be utilized here for two stub connections.

The heat exchanger 2 with the connection block 30, which is soldered onto the heat exchanger 2, is pushed into the intake manifold 1, with the result that the two holes 3a or the two through openings 31 come to lie below the abovementioned openings 10 in the intake manifold 1. In the illustrated embodiment, eight threaded blind holes 31 (FIG. 2) are situated in the connection block 30. The intake manifold 1 has a further eight through openings (not shown) which correspond with the threaded blind holes 31, with the result that screws (likewise not shown) can be screwed through the through openings into the threaded blind holes 31, in order to fasten the heat exchanger 2 in the intake manifold 1. In other embodiments there may be more or fewer threaded blind holes 31, through openings, and screws.

The two stubs 4 are then used. A second seal 6, namely a gasket 6, is pushed onto the stub shank 4a of the stubs 4. In the exemplary embodiment, the gasket 6 has an approximately L-shaped cross section. The stubs 4 have a groove 4b in the stub shank 4a, into which groove 4b the first seal 5, namely an O-ring seal, is inserted.

According to FIG. 1, the stubs 4 are, for example, screwed into the assigned openings 10 or are fastened in some other way, which has not been shown.

In the end position of the stubs 4, the stub shank 4a is plugged with the O-ring seal 5 in the through opening 31 of the connection block 30. In this position, a collar 4c of the stub 4 bears against a border 11 of the opening 10. In this position, the gasket 6 is loaded with a permissible pressing force.

Figure 3:
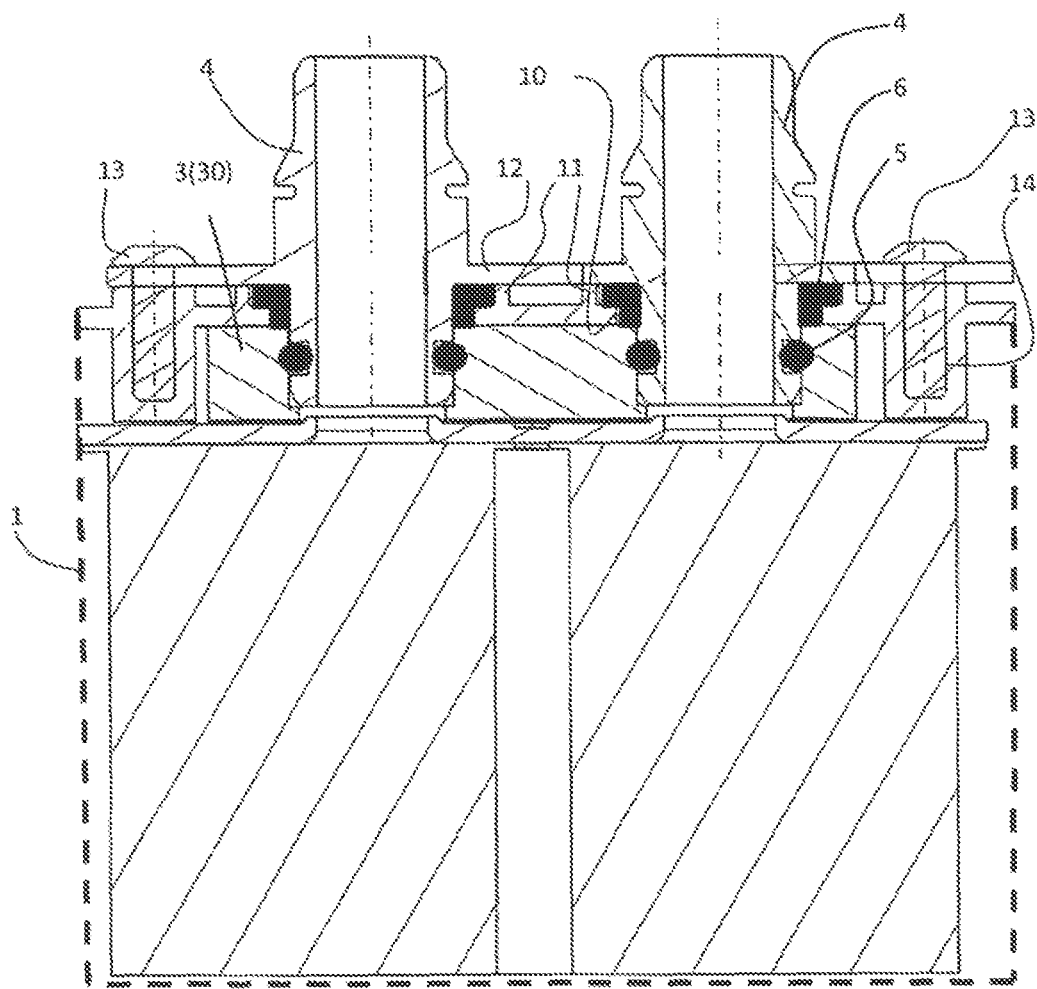
FIG. 3 shows a second exemplary embodiment.
Figure 4:
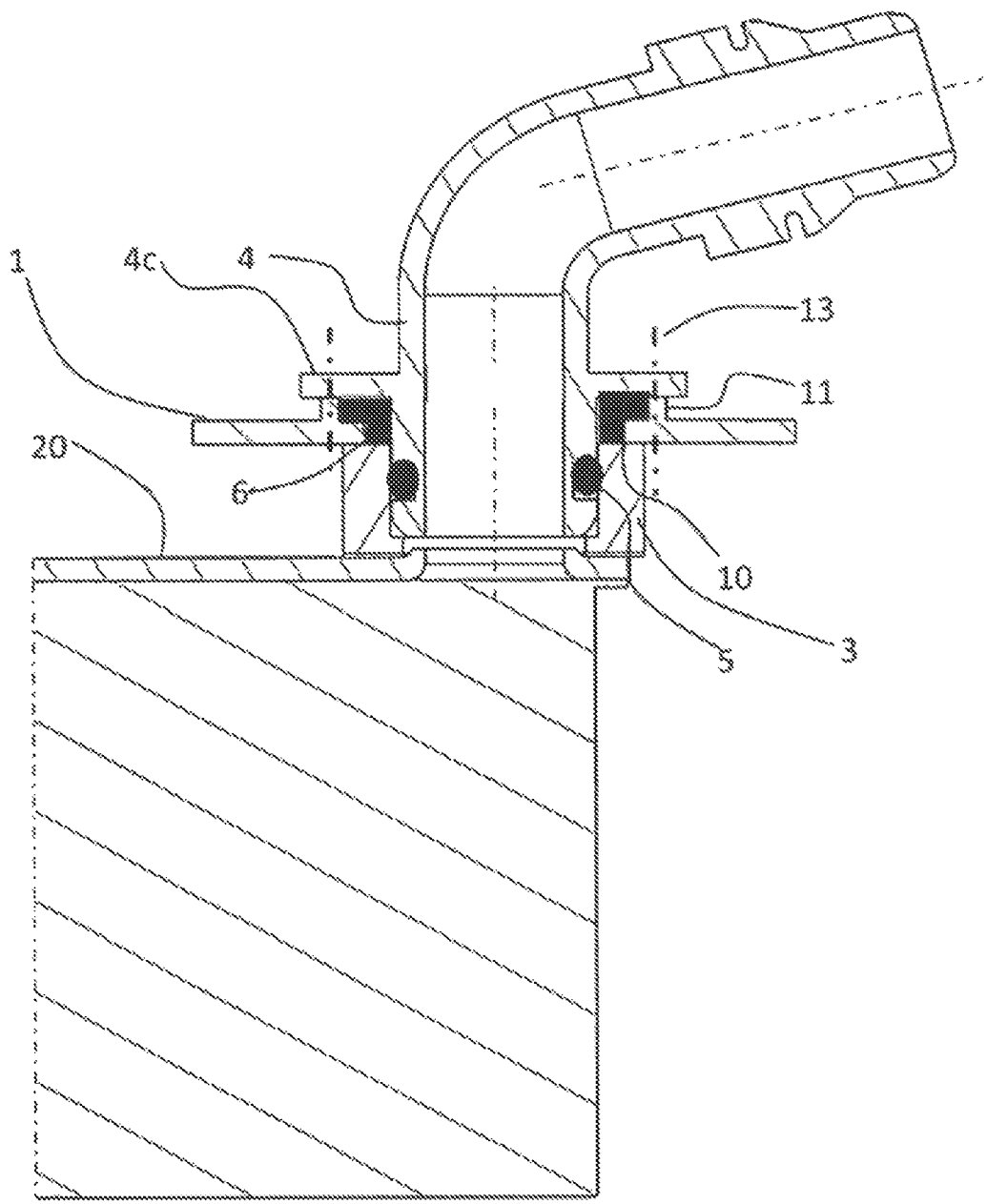
FIG. 4 shows a stub connection having an angled-away stub.

As FIGS. 1, 3, and 4 show, a distal end of one (vertical) limb of the gasket 6 lies fixedly on the connection block 30 and prevents the charge air LL from flowing between the plastic housing 1 and the metallic connection block 30 as far as up to the stub 4. At the same time, the gasket 6 prevents with its other (horizontal) limb the charge air from escaping to the outside and to pass via an upper path to the stub 4, which FIGS. 1, 3, and 4 likewise show.

Since the charge air cannot flow up to the stub 4, the other side of the O-ring seal 5 (its upper side in FIGS. 1, 3 and 4) also does not come into contact with the charge air LL. In contrast, the lower side of the O-ring seal 5 is in contact with the coolant.

Since the stub 4 is plugged with its lower stub shank 4a in the manner of a plug-in stub in the through opening 31 of the connection block 30, the coolant which flows through the apertures 21 can pass as far as the abovementioned lower side of the O-ring seal 5, but not beyond it. The coolant therefore also cannot penetrate as far as the gasket 6 which seals on the air side.

In the exemplary embodiment according to FIG. 3, a different type of fastening has been shown and, moreover, the two stubs 4 have been combined to form a common component 12 which is fastened by means of screws 13 in threaded holes 14 which are formed in the intake manifold 1. In this case, the common component 12 forms the other part 4. It can be said that the common component 12 has been produced by virtue of the fact that the abovementioned collars 4c on the stubs 4 have been formed as a common, or as a connecting, wall. As should be clear from FIG. 3, no further sealing means are required in the region of the screws 13, because the gasket 6 also assumes the sealing action which is necessary there. On account of missing designations in FIG. 3, reference can be made to FIG. 1.

The embodiments according to FIG. 3 or 4 (see below) have the further advantage in comparison with the prior art which was cited at the outset that the bracing of the parts 3 and 4 which is to be performed during the installation of the heat exchanger into the housing (intake manifold 1) does not lead to the gas-side bypass which was addressed above, to be precise, below, between the housing 1 and the heat exchanger 2, which bypass either has to be accepted or has to be sealed in a complicated manner in the prior art.

FIG. 4 shows one embodiment with an angled-away stub 4. Here, the fastening likewise takes place by means of a screw connection 13 which is configured through the collar 4c of the stub 4 into the border 11 of the opening 10, which is to be indicated by means of the two vertical dash-dotted lines. There is of course also one embodiment (not shown) like FIG. 3 with two angled-away stubs 4.

Should the action of the annular seal 5 nevertheless decrease after an extremely long time period, the function of the arrangement would first of all not be impaired because the coolant would then be stopped by the second seal 6 (gasket).

What is claimed is:

1. A stub connection for a heat exchanger that is arranged in a housing, the stub connection comprising:
    a first part which is fastened to the heat exchanger;
    a second part which has a stub shank extending through a housing opening, the stub shank including a first stub end with a first stub end opening and a second stub end with a second stub end opening, the second stub end being seated in a first hole of the first part; and
    at least two seals, the first seal being an annular seal which is seated in a groove of the stub shank, the second seal being a gasket which engages the housing opening, the stub shank, and the first part;
    wherein the first seal is seated in the first hole and seals between the stub shank and the first part.

2. The stub connection according to claim 1, wherein the second seal is arranged above the first seal.

3. The stub connection according to claim 1, wherein the first part is a connection block which is fastened to a cover plate of the heat exchanger and which has a through opening which forms the first hole and in which the stub shank is seated with the first seal.

4. The stub connection according to claim 1, wherein the first part is a connection block which is fastened to a cover plate of the heat exchanger and includes a second hole, wherein the first hole and the second hole are separate holes that extend through the connection block and are each in separate fluid communication with the heat exchanger.

5. The stub connection according to claim 4, wherein the heat exchanger has a stack including plate pairs and corrugated fins and the cover plate, the plate pairs having apertures which hydraulically connect the plate pairs.

6. The stub connection according to claim 4, wherein the first and second holes of the connection block are connected hydraulically to the apertures.

7. The stub connection according to claim 1, wherein the first seal seals toward a first heat exchanging medium and is not in contact with a second heat-exchanging medium.

8. The stub connection according to claim 7, wherein the second seal seals toward the second heat-exchanging medium and is not in contact with the first heat-exchanging medium.

9. The stub connection according to claim 8, wherein a side of the first seal is arranged so as to point toward the second seal and a side of the second seal bears against the stub shank.

10. The stub connection according to claim 1, wherein the annular seal is an O-ring seal and the gasket has an L-shaped cross section.

11. The stub connection according to claim 10 wherein a first limb of the L seals toward the stub shank, and a distal end of the first limb extends through the opening and seals toward the first part.

12. The stub connection according to claim 11, wherein a second limb of the L seals toward one of the opening or the outside.

13. The stub connection according to claim 12, wherein a distal end of the second limb abuts a border of the opening.

14. The stub connection according to claim 13, wherein a collar on the stub shank rests on the border and limits the insertion depth of the second part in the first part of the stub connection, such that the clamping forces that act on the gasket do not rise above an impermissible level.

15. The stub connection of claim 1, wherein the first part engages one of the seals with the first hole and the other of the seals with a top surface of the first part.

16. A charge air cooler comprising:
- an intake manifold into which two heat-exchanging mediums flow;
- a heat exchanger, which is located within the intake manifold, having a stack of plates and fins through which the two heat-exchanging mediums separately flow;
- a connection block positioned between the intake manifold and the heat exchanger;
- a first seal; and
- a second seal,
- wherein the first seal engages with the connection block and the second seal engages with the connection block and with the intake manifold.

17. The charge air cooler of claim 16, wherein the heat exchanger includes a first flow channel for a first one of the heat-exchanging mediums and the intake manifold includes a second flow channel for a second one of the heat-exchanging mediums, and
wherein the first seal is exposed to the first heat exchanging medium and the second seal is exposed to the second heat exchanging medium, and
wherein the first seal prevents the exposure of the second seal to the first heat exchanging medium and the second seal prevents the exposure of the first seal to the second heat exchanging medium.

18. The charge air cooler of claim 16, wherein the first seal is disposed on the inside of the heat exchanger and wherein the second seal is disposed between the inside of the intake manifold and the first seal and is disposed between the first seal and the outside of the intake manifold.

19. A charge air cooler comprising:
- an intake manifold into which first and second heat-exchanging mediums flow;
- a heat exchanger, which is located within the intake manifold, having a stack of plates and fins through which the first and second heat-exchanging mediums separately flow;
- a connection block through which the first heat-exchanging medium flows; and
- a stub including a first stub end with a first stub end opening, a second stub end with a second stub end opening, a first seal, and a second seal, both the first and the second seals located on the stub,
- wherein the first seal is disposed within the connection block, and the second seal is at least partially disposed on the connection block.

20. The charge air cooler of claim 19, wherein the stub includes a collar disposed on the outside of the intake manifold and wherein the second seal is sandwiched between the collar and the intake manifold and connection block.

* * * * *